US011493644B2

(12) United States Patent
Farnham et al.

(10) Patent No.: US 11,493,644 B2
(45) Date of Patent: Nov. 8, 2022

(54) IDENTIFICATION OF SELECTED ITEMS THROUGH RADIOLOCATION AND MOVEMENT DETECTION

(71) Applicant: Kabushiki Kaisha Toshiba, Minato-ku (JP)

(72) Inventors: Timothy David Farnham, Bristol (GB); Zubeir Bocus, Bristol (GB)

(73) Assignee: Kabushiki Kaisha Toshiba, Minato-ku (JP)

( * ) Notice: Subject to any disclaimer, the term of this patent is extended or adjusted under 35 U.S.C. 154(b) by 741 days.

(21) Appl. No.: 16/355,047

(22) Filed: Mar. 15, 2019

(65) Prior Publication Data
US 2020/0292715 A1 Sep. 17, 2020

(51) Int. Cl.
*G01S 19/42* (2010.01)
*H04W 4/029* (2018.01)
*H04L 9/32* (2006.01)
*G01S 13/87* (2006.01)

(52) U.S. Cl.
CPC .......... *G01S 19/428* (2013.01); *G01S 13/876* (2013.01); *H04L 9/3247* (2013.01); *H04W 4/029* (2018.02)

(58) Field of Classification Search
CPC .... G01S 5/02521; G01S 19/428; G01S 19/00; G01S 2013/468; G01S 13/876; G01S 13/10; G01S 13/46; G01N 2203/0214; H04L 9/3247; H04W 4/029; H04W 48/01; H04W 4/80
See application file for complete search history.

(56) References Cited

U.S. PATENT DOCUMENTS

| 7,079,809 B1 | 7/2006 | Scherzer |
| 7,203,489 B2 | 4/2007 | Saunders |
| 7,626,969 B2 | 12/2009 | Hart et al. |
| 8,326,451 B2 * | 12/2012 | Schantz ................ G01S 13/751 700/215 |

(Continued)

FOREIGN PATENT DOCUMENTS

| CN | 1503592 A | 6/2004 |
| CN | 1711719 A | 12/2005 |

(Continued)

OTHER PUBLICATIONS

Yousefi, S., Narui, H., Dayal, S., Ermon, S., & Valaee, S. (2017). A Survey on Behavior Recognition Using WiFi Channel State Information. IEEE Communications Magazine, 55(10), 98-104. (Year: 2017).*

(Continued)

*Primary Examiner* — Peter M Bythrow
*Assistant Examiner* — Oladimeji Oyegunle
(74) *Attorney, Agent, or Firm* — Oblon, McClelland, Maier & Neustadt, L.L.P.

(57) ABSTRACT

A method of identifying item selection by a user, the method comprising: receiving signals at a receiver of a fixed terminal from a transmitter of a mobile terminal associated with the user, generating a signature at the receiver of the fixed terminal of the movement of the user based on changes in the signals received from the transmitter, matching the signature with prior stored movement information to determine the movement of the user, and identifying the item being selected by the user based on the determined movement of the user.

20 Claims, 6 Drawing Sheets

(56) References Cited

U.S. PATENT DOCUMENTS

| | | | |
|---|---|---|---|
| 10,521,646 B2* | 12/2019 | Adato | G06V 40/10 |
| 2002/0082010 A1 | 6/2002 | Koorapaty et al. | |
| 2003/0053413 A1 | 3/2003 | Sawahashi et al. | |
| 2007/0127559 A1 | 6/2007 | Chang | |
| 2008/0147461 A1* | 6/2008 | Lee | G01S 1/7034 |
| | | | 705/7.34 |
| 2008/0165741 A1 | 7/2008 | Fu et al. | |
| 2008/0233955 A1 | 9/2008 | Narang et al. | |
| 2012/0046060 A1 | 2/2012 | Katayama | |
| 2012/0319823 A1 | 12/2012 | Butler et al. | |
| 2014/0066078 A1 | 3/2014 | Hunt et al. | |
| 2017/0046707 A1 | 2/2017 | Krause et al. | |
| 2017/0094588 A1* | 3/2017 | Naqvi | G06Q 30/0267 |

FOREIGN PATENT DOCUMENTS

| | | | | |
|---|---|---|---|---|
| EP | | 1 424 862 A1 | 6/2004 | |
| EP | | 1 744 573 A1 | 1/2007 | |
| WO | WO 2004/045225 A2 | | 5/2004 | |
| WO | WO 2007/021071 A1 | | 2/2007 | |
| WO | WO 2010/015286 A1 | | 2/2010 | |
| WO | WO 2010/116688 A1 | | 10/2010 | |
| WO | WO-2016011433 A2 * | | 1/2016 | G01S 5/0054 |

OTHER PUBLICATIONS

Wang, X., Gao, L., & Mao, S. (2016). CSI Phase Fingerprinting for Indoor Localization With a Deep Learning Approach. IEEE Internet Of Things Journal, 3(6), 1113-1123. (Year: 2016).*

Xu, J., Yuhao Wang, & Zhe Wang. (2006). A Novel Measurement-Based Algorithm for Coverage Prediction of Urban and Suburban Cells in Wireless Networks. IEEE Transactions On Antennas And Propagation, 54(11), 3138-3142. (Year: 2006).*

Xu, L., Wang, Y., Liu, Y., Wei, M., & Si, Y. (2008). Enhanced Signal-Strength-Difference Position Method Based on an Inversion Propagation Model in Cellular Network. 2008 4Th International Conference On Wireless Communications, Networking And Mobile Computing. (Year: 2008).*

* cited by examiner

IDENTIFICATION OF SELECTED ITEMS THROUGH RADIOLOCATION AND MOVEMENT DETECTION

FIELD

Embodiments described herein relate generally to identifying an item using radio signals. More specifically, embodiments relate to identifying an item being selected by a user.

BACKGROUND

Conventional methods for detecting the location and item selection or movement may utilise camera based systems. Alternatively, barcode/QR code or Radio-frequency identification (RFID) scanners may be employed but are cumbersome or costly to deploy and use.

Visual object detection techniques are conventionally used for retail and other application scenarios to determine selection of items by users. However, such techniques rely on unobstructed visual tracking via multiple cameras. Alternatively, individual scanning of items is required using barcode/QR code or RFID tags.

Recent advances in visual object detection and tracking technologies for situation awareness, in retail and other sectors, have made it possible to use multiple cameras in order to track people and items. However, such approaches require significant amounts of fixed infrastructure to be deployed with the associated high complexity. Alternative approaches that use local scanning or barcode/QR code or RFID tags on items are cumbersome to perform due to the close proximity needed between the scanner and item or the backscatter interference when multiple tags are within the scanner range.

To solve these prior problems some techniques utilise cameras that support infrared depth and optical sensing or multi-mode/frequency tags. For instance, multi-frequency RFID tags with multiple scanners may be used to overcome backscatter interference by resolving the backscatter signals from each tag using different frequencies and spatial separation of scanners. Alternatively, with infrared depth image cameras it is possible to identify objects by their 3D shapes. They can also detect whether an item is being held or not by also identifying hands and other body parts of users.

However, these prior approaches to solving the problems rely on deploying more infrastructure with more modes of operation or using more complex tags and scanning which may be both undesirable.

BRIEF DESCRIPTION OF THE DRAWINGS

In the following, embodiments will be described with reference to the drawings in which.

DETAILED DESCRIPTION

Figure 1:
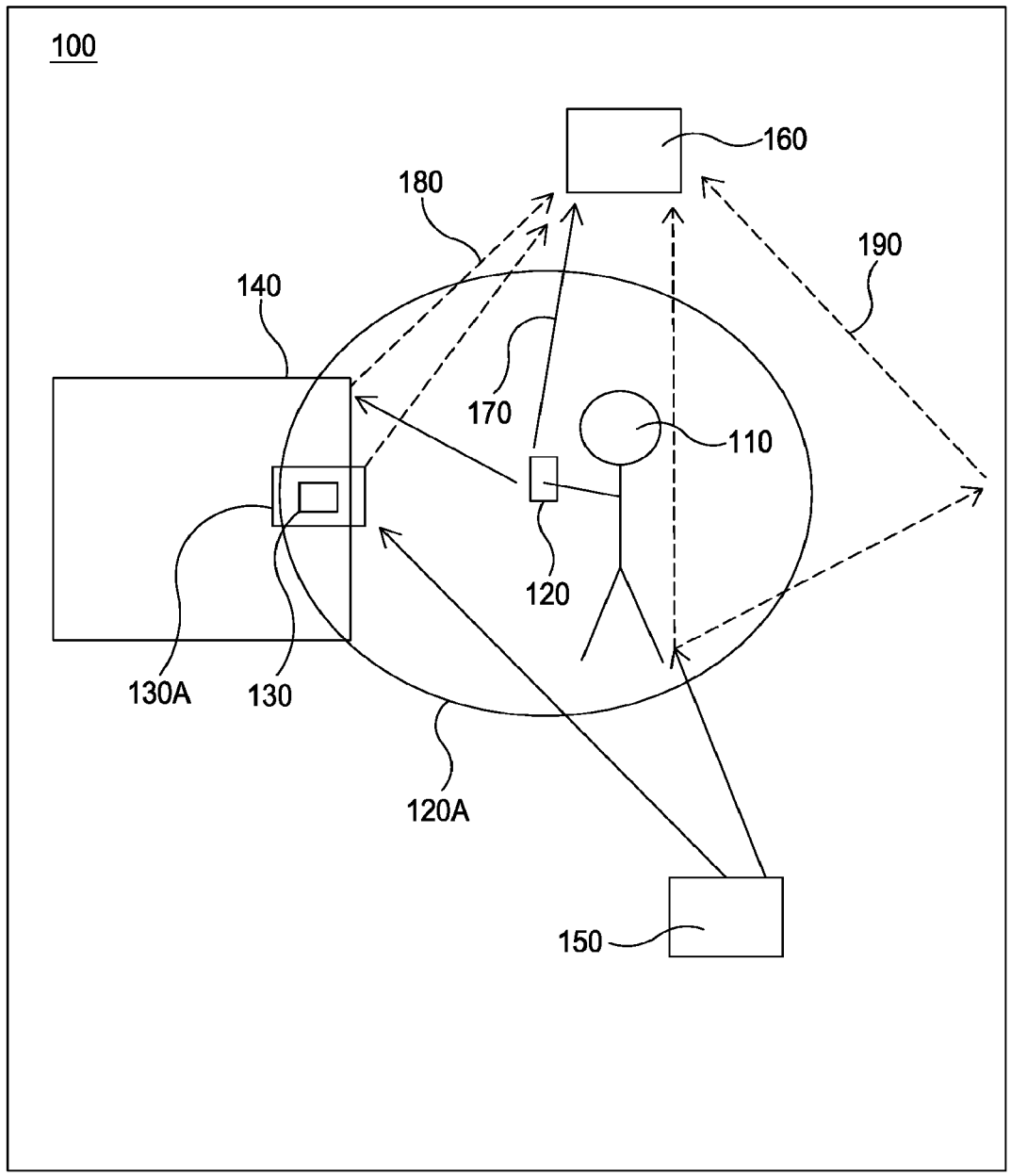
FIG. 1 illustrates a schematic diagram of a retail environment where a user selects an item according to an embodiment.

In an embodiment, there is provided a method of identifying item selection by a user. The method comprising: receiving signals at a receiver of a fixed terminal from a transmitter of a mobile terminal associated with the user, generating a signature at the receiver of the fixed terminal of the movement of the user based on changes in the signals received from the transmitter, matching the signature with prior stored movement information to determine the movement of the user, and identifying the item being selected by the user based on the determined movement of the user.

In an embodiment, the method further comprises generating the signature at the receiver of the fixed terminal based on channel state information (CSI) from the mobile terminal.

In an embodiment, the method further comprises generating the signature at the receiver of the fixed terminal based on at least one of Angle of Arrival, time of arrival, and Doppler shifts of reflected paths of the signals from the mobile terminal.

In an embodiment, the method further comprises determining the location of the mobile terminal.

In an embodiment, the method further comprises determining the location of the mobile terminal using at least one of: a) parameters derived from channel state information (CSI) from the mobile terminal at a plurality of terminals and performing triangulation; and b) using a radio map lookup and track.

In an embodiment, the parameters are at least one of Angle of Arrival, time of arrival, and Doppler shifts of direct paths from the mobile terminal.

In an embodiment, the method further comprises using the signature to refine the location of the mobile terminal.

In an embodiment, the method further comprises identifying the item being selected by matching the location of the mobile terminal with stored item location information.

In an embodiment, the prior stored movement information comprises known movement signatures of the user selecting the item.

In an embodiment, the method further comprises determining the known movement signatures of the user selecting the item by capturing the signature of a particular known movement of the user, and then annotating the signature with the particular known movement.

In an embodiment, the method further comprises determining the known movement signatures of the user for the specific environment in which the item and/or user is located.

In an embodiment, the method further comprises matching the signature with prior stored movement information using at least one of signal processing, machine learning and deep learning.

In an embodiment, the method further comprises using image and/or pressure sensors for indicating removal or replacement of the item.

In an embodiment, the method further comprises predicting movement of the user using the fixed terminal and/or a plurality of fixed terminals, and using reflected signals received by a respective receiver of the fixed terminal and/or one of the plurality of fixed terminals from a respective transmitter of the fixed terminal and/or another of the plurality of fixed terminals, and using the determined movement of the user to improve the predicted movement of the user.

In an embodiment, there is provided a system for identifying item selection by a user. The system comprising: a receiver, a controller and memory storing program instructions. The program instructions of the system causing the respective controller, when executed by the respective controller, to: receive signals via a respective receiver of a fixed terminal from a transmitter of a mobile terminal associated with the user, generate a signature of the movement of the user based on changes in the signals received from the transmitter, match the signature with prior stored movement information to determine the movement of the user, and identify the item being selected by the user based on the determined movement of the user.

In an embodiment, the mobile terminal is at least one of a WiFi device, a smartphone, and a smartwatch.

In an embodiment, the fixed terminal is at least one of a WiFi device, an WiFi access point, and a WiFi beacon.

In an embodiment, the respective program instructions of the system further causing the respective controller, when executed by the respective controller, to: generate the signature at the respective receiver of the fixed terminal based on channel state information (CSI) from the mobile terminal.

In an embodiment, the respective program instructions of the system further causing the respective controller, when executed by the respective controller, to: determine the location of the mobile terminal.

In an embodiment, the respective program instructions of the system further causing the respective controller, when executed by the respective controller, to: identify the item being selected by matching the location of the mobile terminal with stored item location information.

In an embodiment, the respective program instructions of the system further causing the respective controller, when executed by the respective controller, to: determine the prior stored movement information from known movement signatures of the user selecting the item by capturing the signature of a particular known movement of the user, and then annotating the signature with the particular known movement.

In an embodiment, the fixed terminal further comprises a transmitter and/or the system comprises a plurality of fixed terminals; the respective program instructions of the system further causing the respective controller, when executed by the respective controller, to: use reflected signals received by the respective receiver of the fixed terminal and/or one of the plurality of fixed terminals from the respective transmitter of the fixed terminal and/or another of the plurality of fixed terminals, and use the determined movement of the user to improve the predicted movement of the user.

In an embodiment, there is provided a fixed terminal for identifying item selection by a user. The fixed terminal comprising: a receiver, a controller and memory storing program instructions. The program instructions of the fixed terminal causing the respective controller, when executed by the respective controller, to: receive signals via the respective receiver from a transmitter of a mobile terminal associated with the user, generate a signature of the movement of the user based on changes in the signals received from the transmitter, match the signature with prior stored movement information to determine the movement of the user, and identify the item being selected by the user based on the determined movement of the user.

In an embodiment, there is provided a non-transitory storage medium comprising computer program instructions, the computer program instructions, when executed by a processor, configured to cause the processor to perform the method as described above.

Embodiments described herein may provide determination of item selection without needing complex and dedicated infrastructure such as cameras or depth cameras.

Embodiments do not need specialist handheld scanners for scanning of individual items or multiple spatially separated RFID scanners to overcome the backscatter interference problem.

Embodiments instead rely on prior knowledge of the locations of items, such as the position on shelves and the location and radio characteristics of the shelves. This is obtained by performing a-priori measurements and mapping of the radio environment. The information is obtained using standard commodity WiFi radio devices that are commonly used and already deployed.

Embodiments may additionally use image based or pressure sensor approaches.

Embodiments may be used in retail premises to detect the item selection by users without the need for dedicated manual scanning.

Embodiments may also be used so that items are placed in the correct places when shelves are restocked.

Embodiments exploit the WiFi (or other) radio signals from terminal devices (e.g. mobile smartphones) that users may carry on them anyway and existing infrastructure in most retail environments, such as WiFi access points. Hence, additional infrastructure is not needed. Embodiments exploit the WiFi access points to detect the signals from the terminals that provide a means to infer the activity and location of the users. The WiFi terminal and access points are standards compliant commodity devices and do not need modification or special applications.

FIG. 1 shows a schematic diagram of a retail environment 100 where a user 110 having a mobile terminal device 120 (terminal) is selecting a (passive) item 130 from a shelf 140. The terminal 120 includes a radio transmitter (e.g. WiFi). The terminal 120 may also include a radio receiver. It will be appreciated that, in other embodiments, there may be a plurality of users and/or a plurality of terminals. In this embodiment, there is a fixed radio transmitter 150 and a fixed radio receiver 160. The fixed radio transmitter 150 and/or the fixed radio receiver 160 may be referred to as a fixed terminal. In some embodiments, there may be a plurality of radio transmitters and a plurality of radio receivers. In some embodiments, the fixed transmitter can also act as the fixed receiver (e.g. a WiFi access point). One or both of the fixed transmitter 150 and the fixed receiver 160 may be a WiFi access point. There may be a plurality of WiFi access points. It will be appreciated that, in other embodiments, the user and the item may be located in environments other than a retail environment, such as a warehouse or factory etc. It will be appreciated that the fixed receiver 160 may provide the signals/information/data etc. to a system (e.g. a computer system). The system may comprise a controller and memory storing program instructions. The program instructions of the system may cause the respective controller, when executed by the respective controller, to carry out the method described herein.

In embodiments, terminal signals sent from the terminal 120 to the fixed receiver 160 may follow a direct path 170 (solid line arrow). In addition, terminal signals sent from the terminal 120 to the fixed receiver 160 may follow a reflected path 180 (dashed line arrow). For example, the signals may be reflected off the shelf 140, as shown, or may be reflected off a boundary (e.g. a wall) of the retail environment etc. It will be appreciated, that there may be many direct 170 and reflected paths 180.

In embodiments, fixed transmitter signals sent from the fixed transmitter 150 may be reflected from the user 110 and may follow a reflected path 190 (dashed line arrow) to the fixed receiver 160. For example, the signals may be reflected off a boundary (e.g. a wall) of the retail environment, as shown, or may be reflected off the shelf 130 etc. In examples, the fixed transmitter signals from the fixed transmitter 150 may be reflected directly off the user 110 to be received by the fixed receiver 160.

Figure 2:
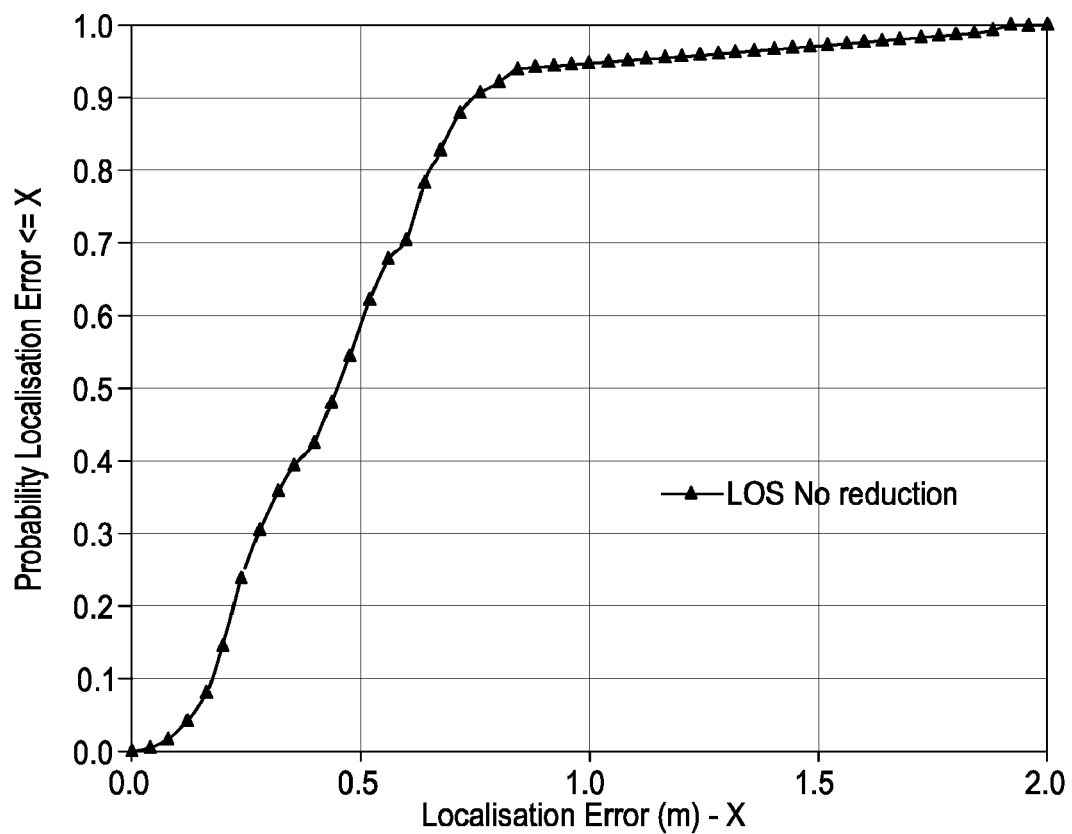
FIG. 2 is a graph showing transmitter localisation error for a WiFi terminal with two access points.

The unique identification of users 110 may be possible by associating them with the terminals 120 (e.g. smartphone/smartwatch) they have, which can be located with a certain accuracy. FIG. 2 shows a transmitter localisation error for a WiFi terminal with two WiFi access points (APs). More particularly, FIG. 2 shows "Localisation Error (m)-X" against "Probability Localisation Error<=X". The data shown is Line of Sight (LOS)-No reduction. This means that there is a Line Of Sight (LOS) between the terminal 120 and APs and that all measurements are used to compute the Angle of Arrival (AoA) at both APs.

In embodiments, there may be a transmitter location error region 120A based on the signals from the mobile terminal 120. In addition, there may be an item location error region 130A based on the signals from the fixed transmitter 150. Analysing the signature of the signals from the terminal 120 may reduce these error regions, i.e. refine the user and item locations. The initial error region 120A is used as the basis to start the search for signatures. Signatures are unique in the region 120A. There may be backscatter reflections from the item 130. That is, signals from the fixed transmitter 150 may be reflected from the item 130 with the reflected signals being received by the fixed receiver 160. The reflected signals may be used to locate the item 130 based on the effect that the combined movements of the user 110 and the item 130 have on the reflected signals.

In embodiments, the activity of interest is item selection and movement. The identification of the item selection is achieved by analysing the signature of the signals received from the terminal 120 (or each terminal) over time periods. The signature comprises the determination of the direct 170 and reflected signal paths 180. This may be e.g. from the Channel State Information (CSI). For instance, as defined in the 802.11n or 802.11ac standard. The CSI is known channel properties of a communication link, i.e. in this case wireless radio communication. The CSI describes how a signal propagates from transmitter to receiver. For example, the combined effect of scattering, fading and power decay with distance. The CSI may need to be estimated at a receiver and then fed back to a transmitter.

Small changes in parameters derived from the CSI, such as the Doppler shifts, time of arrival and angle of arrival (AOA) of multipath reflected signals (e.g. including reflected signal path 180) over a period of time, are used to infer some user specific movements. The movement patterns inferred from the CSI from the terminals 120 (e.g. user-owned devices, such as smartphones) can provide predicted movement patterns. That is, they can be used to identify the particular movement of the user 110 based on the signature of the signals received from the terminal 120. This is because, as the user 110 moves, the terminal 120 may also move and/or the body of the user 110 may block some of the signals from the terminal 120, which will change the way the signals propagate to the fixed receiver 160. By comparing the signature of the signals from the terminal with stored signatures, the actual movement of the user 110 may be determined, as will be described further. This can provide a refined and more accurate determination of what items 130 are being moved (selected) by the user 110.

Furthermore, in some embodiments, the movement patterns inferred from the CSI from the terminals 120 may be used to help refine the predicted movement patterns from the CSI based on the fixed infrastructure (the fixed transmitter 150 and the fixed receiver 160) alone. Movement of the user 110 causes a change in the signal reflections from the fixed transmitter 150, which results in variations in the CSI. Thus, in a similar way as described for the signature of the signals received from the terminal 120, the signature of the signals received from the fixed transmitter 150 reflected or attenuated by the user 110 may be used to identify the particular movement of the user 110.

Figure 3:
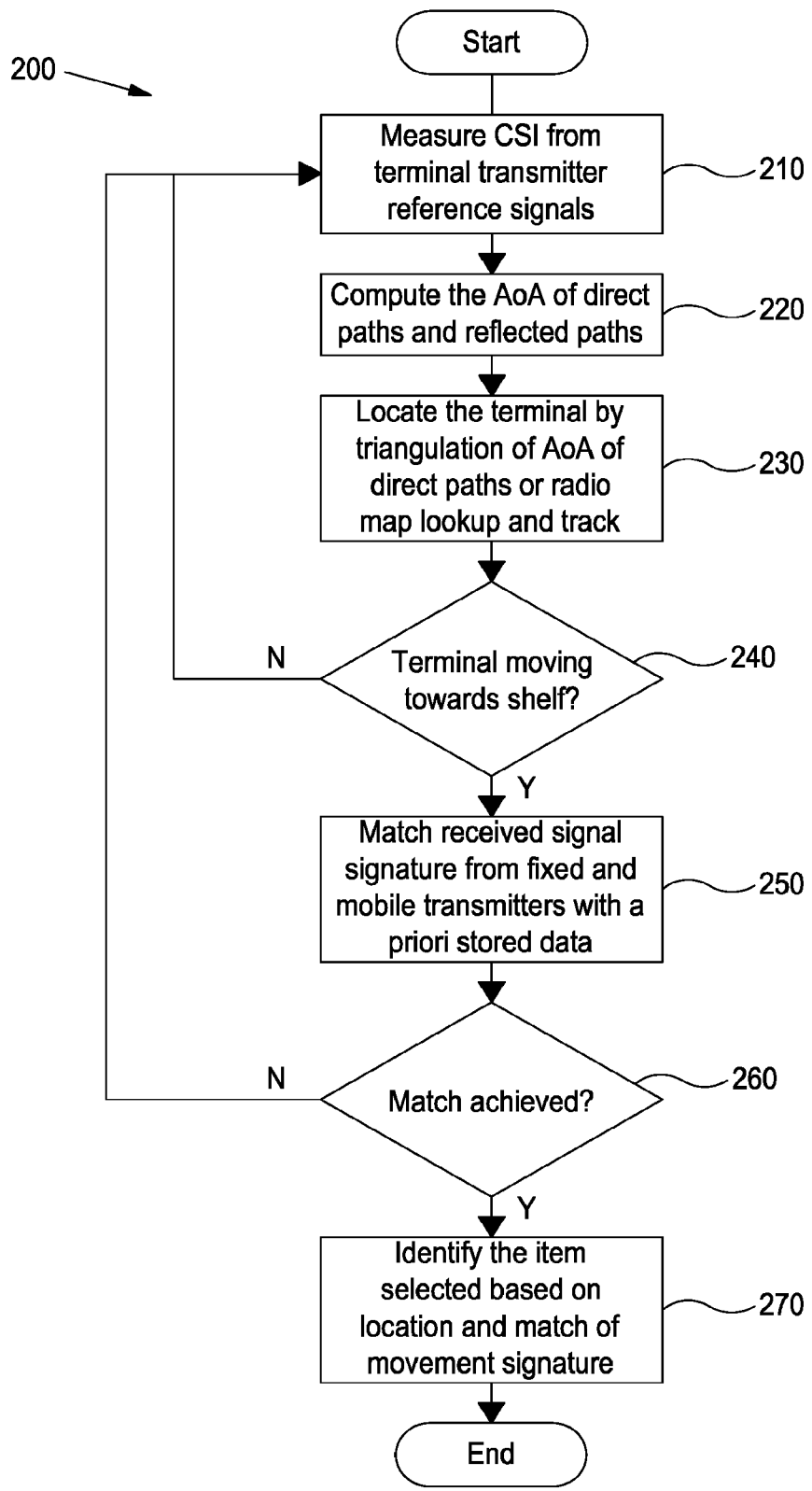
FIG. 3 is a flow diagram of a method of identifying the item selected by the user according to an embodiment.

FIG. 3 shows a flow diagram of a method 200 of identifying the item 130 selected by the user 110.

In step 210, the CSI is measured from terminal 120 transmitter reference signals (e.g. signals following the direct paths 170 and reflected paths 180).

In step 220, the angles of arrival (AoA) are computed from the direct paths 170 and the reflected paths 180.

In step 230, the terminal 120 (or terminals) is localised using reference signal transmissions from the terminal 120 by identifying parameters such as the Angle of Arrival, time of arrival and Doppler shifts, of direct paths 170 from the received CSI over a set of packets and performing triangulation. Alternatively, the terminal 120 may be located by using a radio map lookup and track. The initial location estimate uses the mobile terminal 120 as the basis to perform a signature search. This reduces the search space and also prevents the problem of ambiguity when multiple identical signatures correspond to different locations, as long as they are not contained in the error region 120A.

In addition, in some embodiments, a signature is formed using the CSI data to refine the location estimate. The signature formed using the CSI data may be referred to as a CSI signature. As an example, the reflected paths 180 AoA may be used as this may be the most useful information to extract from the CSI. In other examples, other parameters may be used that can be derived from the CSI. The location estimate may be refined by comparing the CSI signature with a priori formed (i.e. previously stored) signature database. In this case, the signature of the reflected paths 180 is matched with a known signature which has a corresponding location. The method of storing the signatures is described later.

In step 240, it is determined at a decision point if the terminal 120 (i.e. the user 110) is moving towards the shelf 140. If the answer is Yes (Y), then the process moves to step 250. If this is not the case, and the answer is No (N), then step 210 is carried out again. This loop continues until it is determined that the terminal 120 is moving towards the shelf 140.

The movements of the user 110 are identified by analysing the changes in the CSI signatures over successive packets, the packets being sent from the terminal 120 and the fixed transmitter 150 and received by the fixed receiver 160. The movement of the user 110 may be, e.g. reaching forward or bending over to pick the item 130 from the shelf 140.

As mentioned, the CSI signature is derived from the CSI data. However, so that the amount of data stored is not excessive it may be processed. The processing can extract the AoA and micro Doppler signature information that can reduce the amount of data and speed up the process (or reduce complexity) of signature matching.

The reason that the packets are being sent from both the (mobile) terminal 120 and the fixed transmitter 150 to be received by the fixed receiver 160 is because the signatures derived from the signals received from the fixed transmitter 150 will exploit the knowledge that the fixed transmitter 150 is stationary so the movement aspects of the CSI signature result only from the user 110 or item 130. The terminal 120 may move between successive measurements and so the resulting movement aspects of the CSI signature result from the combined movement of the terminal 120 and item 130 or user 110. This can help to resolve uncertainty when there are many similar signatures. However, in other embodiments, the packets may be sent only from the terminal 120 and/or the signature may be derived only from the packets sent from the terminal 120.

In step 250, the detected movement and the location of the user 110 are matched with the known movement signatures of a user selecting an item. The location is determined first so that the search space for signature matching is sufficiently small to avoid excessive processing and also eliminate the issue of signature ambiguity.

The CSI signatures in their raw form provide some location and movement information. This information can be extracted and stored separately or indeed in a combined signature. The information may be stored separately to reduce processing time in the matching.

The movement signature may extract the micro-Doppler information whereas the location signature may extract the AoA of different signal paths or CSI phase and amplitude information.

In this embodiment, the signals from both the mobile terminal 120 and the fixed transmitter 150 are used in determining the movement signatures. At least two sets of known movement signatures may be used; one corresponding to the signatures if only the fixed infrastructure is exploited while the second set of signatures relate to the patterns derived from a mobile terminal such as a smartphone. The movement signatures from the fixed transmitter 150 are not directly affected by movement of the (mobile) terminal 120. The movement signatures of the terminal 120 may be affected by movement of items 130, users 110 and the terminal 120. It will be appreciated that, in other embodiments, only the signals from the mobile terminal 120 may be used to calculate the movement signatures.

In step 260, it is determined if a match has been achieved between the detected movement signature and a known movement signature at a decision point. If the answer is Yes (Y), then the process moves to step 270. If this is not the case, and the answer is No (N), then step 210 is carried out again. This second loop continues until it is a match is determined in step 260.

In step 270, the item 130 is identified based on the refined location determined in step 230 and the match of the movement signature in step 250. The item 130 at the determined location of the terminal 120 may be known. The known location of the item may be taken from a map with the type of item entered (e.g. manually) or it may be measured. The same approach may be used when stocking shelves to update the inventory system of the location of the stock items. The location of the user 110 and the particular movement of the user 110 (e.g. reaching forward to grab the item 110) at that location, in combination with the known item at that particular location, may be used to identify the particular item 130 being selected by the user 110.

Figure 4:
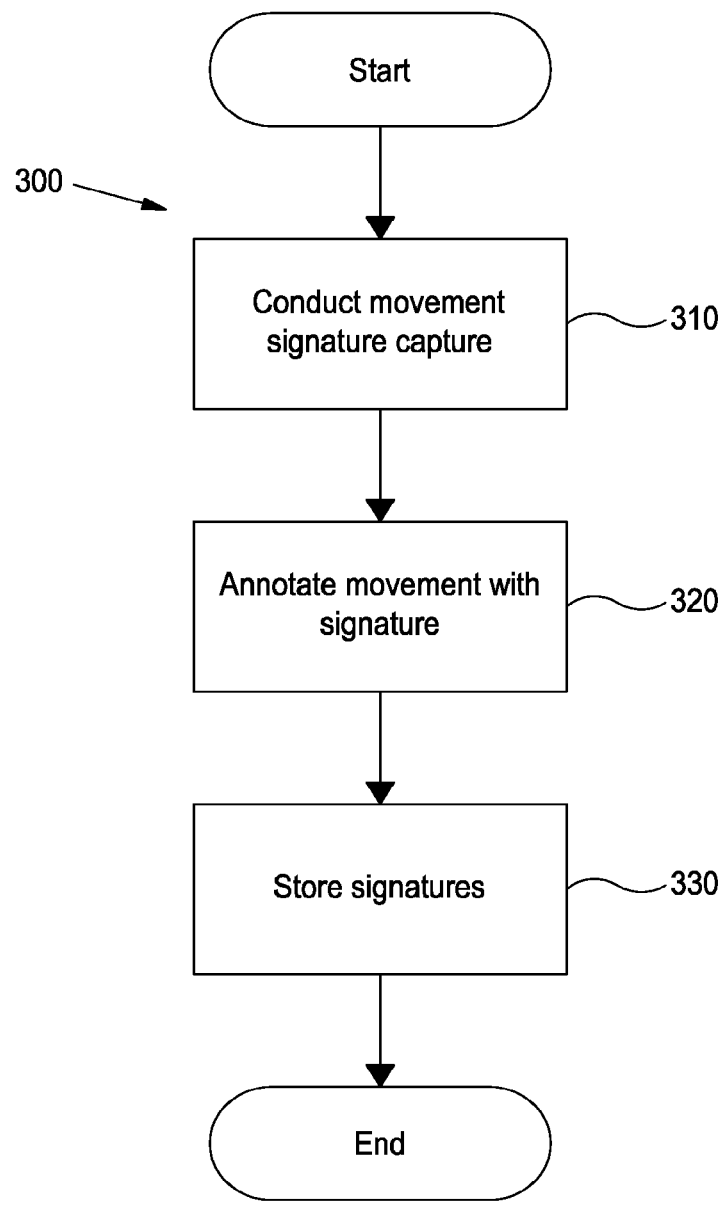
FIG. 4 is a flow diagram of a method of capturing signature information for a movement of a user and recording a priori movement signatures according to an embodiment.

FIG. 4 shows a flow diagram of a method 300 of capturing signature information for a movement of a user 110 and recording a priori movement signatures. The movement may be, for example, the user 110 bending over to pick up the item 130 from the shelf 140.

In a step 310, the user 110 makes the specified known movement and the signature of the movement is captured. The movement signature is captured using the CSI of the signals received by the fixed receiver 160 from the terminal 120 and the fixed transmitter 150. In other embodiments, the signals may only be received from the terminal 120 (e.g. there may not be a fixed transmitter 150).

In step 320, the movement is annotated with the signature. The annotation of signatures may be performed e.g. manually (i.e. by a user) or by using a robot. In the case of a robot, the movements can be performed overnight and updated regularly if necessary. In the manual case, a single collection phase may be performed. When there are common layout patterns, this can be exploited to reduce the amount of collection necessary.

In step 330, the signatures are stored, e.g. in a priori formed signature database. The signature database includes the captured movements (e.g. bending over, bending forward, stretching forward, walking etc.) being associated with corresponding signatures.

The signature database can be accessed so that a measured signature may be matched with a known signature. The particular movement that the user 110 is doing at that particular time may then be provided from the signature database.

The a priori movement signatures can be formed (see FIG. 4) for certain shelf types and layouts without the need to be within each of the individual stores. However, it is potentially also advantageous to conduct calibration within stores, i.e. determining the known movement signatures of the user for the specific environment in which the item 130 and user 110 are located. For example, by performing survey measurement with devices equipped with more accurate ground truth detection capabilities (for instance depth cameras or LIDAR).

This can improve the localisation accuracy by capturing radio maps or location signature databases during the deployment process within each store/retail premise.

Figure 5:
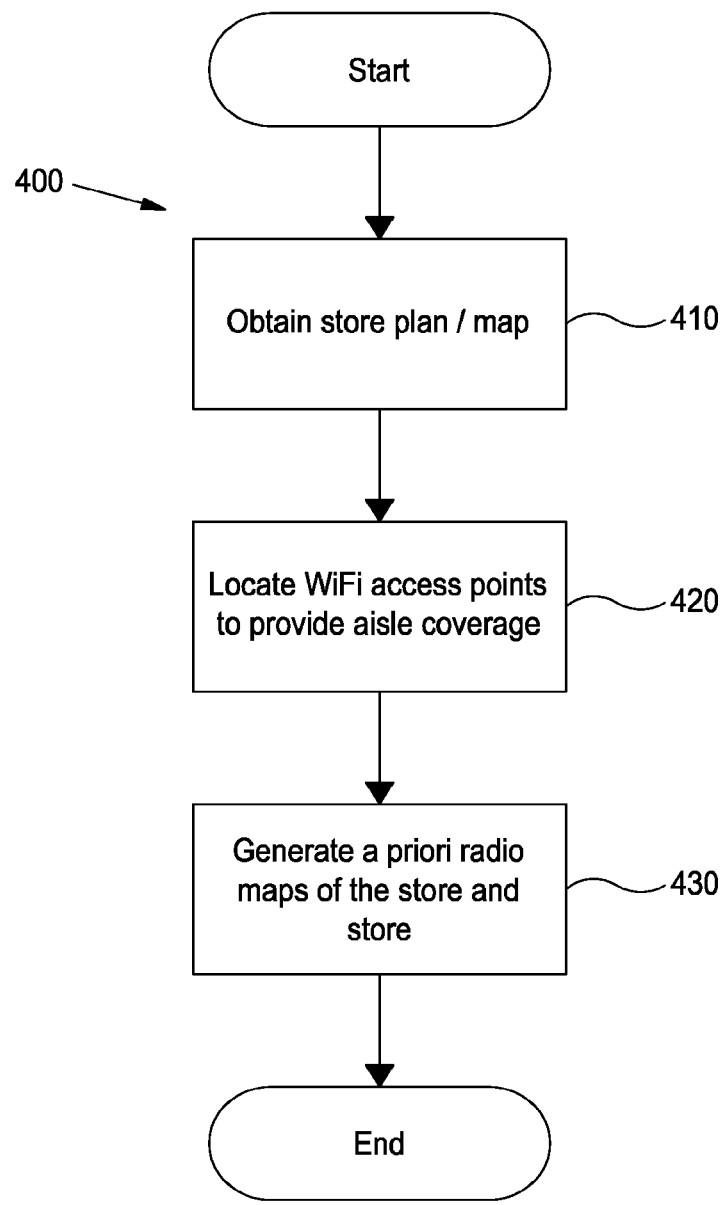
FIG. 5 is a flow diagram of a method of deploying radio access points and generating radio maps of a store.

FIG. 5 shows a flow diagram of a method 400 of deploying radio access points and generating radio maps of a store.

In step 410, a store plan or map is obtained. This may include the locations of walls, shelves, aisles etc.

In step 420, fixed radio transmitters and receivers (e.g. WiFi access points) are located in particular locations to provide coverage for the aisles. This is so signals (either being transmitted or being received, or both) are present where the user 110 may be picking the items from the shelf 140.

In step 430, a priori radio maps of the store are generated and then stored, e.g. in database. The location and radio characteristics of the shelves and/or items on the shelves may be obtained.

This can reduce the measurements required by exploiting the symmetry and regular geometry of typical store layouts. For instance, measurement interpolation can be performed considering the store layout plan or map and determining lines of symmetry and geometric uniformity to interpolate and extrapolate the measurements. The radio maps may also improve accuracy if the reflections from static objects e.g. the shelves, walls and items are estimated, from a combination of layout plans and prior measurements, by eliminating unfeasible or erroneous signatures.

In other embodiments, image based or pressure sensor approaches may be used in conjunction with the above described methods. For example, the image based method may be used to detect gaps in shelves indicating an item or items have been removed, or conversely placed into an existing gap. As another example, the shelf 140 (or shelves) may have embedded pressure sensors or scales to measure the removal or replacing of an item 130 (or items) from the shelf 140. There may be a potential ambiguity if the user 110 picks up the item 130 but then replaces it. It may be assumed that the item 130 has been taken when, in fact, it has been replaced (i.e. put back in place). This may be overcome with the pressure sensors in the shelf 140 (or shelves) indicating removal and/or replacement if this is deemed to be an issue.

Figure 6:
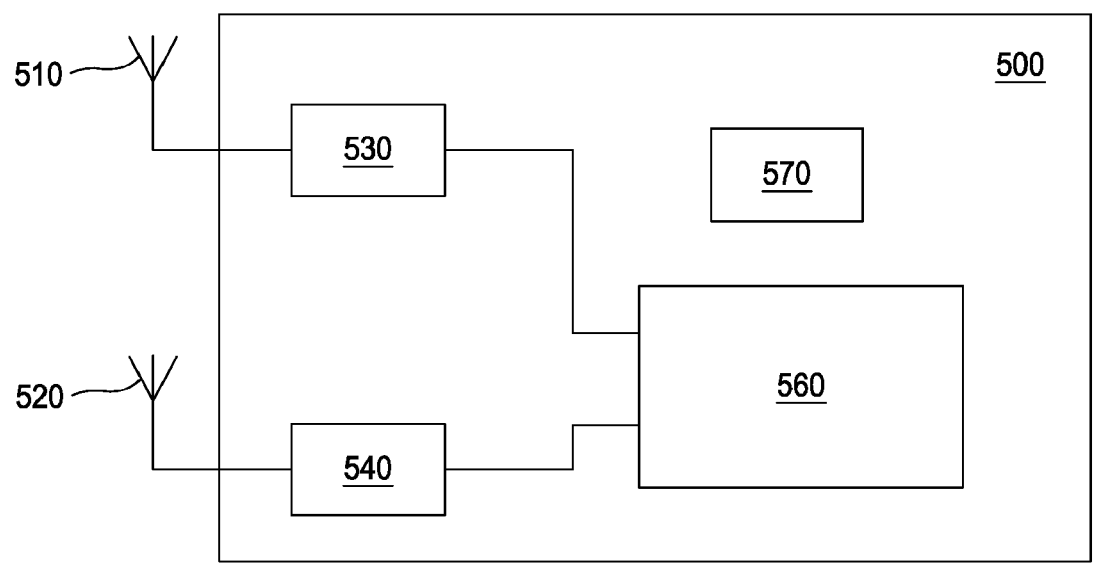
FIG. 6 illustrates a device according to an embodiment.

FIG. 6 shows a device 500 for transmitting and receiving radio signals according to an embodiment. The device 500 may be a mobile terminal 120 or a fixed transmitter and receiver (such as a WiFi access point). The device 500 comprises a transmit 510 and a receive 520 antenna or a combined antenna used for both transmission and reception, a transmit chain 530 and a receive chain 540. The device 500 moreover comprises a controller 560 and non-volatile memory 570. The controller 560 is configured to access computer program instructions stored in the memory 570 and to execute the methods described herein on the basis of these instructions. It will be appreciated that in other embodiments, the device may be for only transmitting or receiving and will thus have only corresponding parts for that particular function.

Whilst certain embodiments have been described, these embodiments have been presented by way of example only, and are not intended to limit the scope of the inventions. Indeed, the novel devices, and methods described herein may be embodied in a variety of other forms; furthermore, various omissions, substitutions and changes in the form of the devices, methods and products described herein may be made without departing from the spirit of the inventions. The accompanying claims and their equivalents are intended to cover such forms or modifications as would fall within the scope and spirit of the inventions.

The invention claimed is:

1. A method comprising: receiving a signal at a receiver of a fixed terminal from a transmitter of a mobile terminal associated with a user, the signal following one of a direct signal path or a reflected signal path, the mobile terminal moving as the user moves; generating, at the receiver of the fixed terminal, a signature of a movement of the user based on a change in the signal received from the transmitter, the signature including information determining the direct signal path and the reflected signal path, the information describing how the signal propagates from the transmitter to the receiver; predicting movement patterns based on the information; matching the signature with prior stored movement information and the predicted movement patterns, the movement information including captured movements associated with corresponding signatures, the captured movements including at least one of movements of the user; determining the movement of the user based on the matching the signature with the prior stored movement information and the predicted movement patterns; and identifying an item selected by the user based on the determined movement of the user.

2. The method of claim 1, further comprising generating the signature at the receiver of the fixed terminal based on channel state information (CSI) from the mobile terminal.

3. The method of claim 2, further comprising generating the signature at the receiver of the fixed terminal based on at least one of angle of arrival, time of arrival, or Doppler shifts of reflected paths of signals from the mobile terminal.

4. The method of claim 1, further comprising determining a location of the mobile terminal.

5. The method of claim 4, further comprising determining the location of the mobile terminal using at least one of:
   a) parameters derived from channel state information (CSI) from the mobile terminal at a plurality of terminals and performing triangulation; or
   b) using a radio map lookup and track.

6. The method of claim 5, wherein the parameters are at least one of angle of arrival, time of arrival, or Doppler shifts of direct paths from the mobile terminal.

7. The method of claim 4, further comprising determining the location of the mobile terminal further based on the signature.

8. The method of claim 4, further comprising identifying the item being selected by matching the location of the mobile terminal with stored item location information.

9. The method of claim 1, wherein the prior stored movement information includes known movement signatures of the user selecting the item.

10. The method of claim 9, further comprising:
    determining the known movement signatures selecting the item by capturing the signature of a particular known movement, and
    annotating the signature with the particular known movement.

11. The method of claim 10, further comprising determining the known movement signatures for a specific environment in which at least one of the item or the user is located.

12. The method of claim 1, further comprising matching the signature with prior stored movement information and the predicted movement patterns using at least one of signal processing, machine learning or deep learning.

13. The method of claim 1, further comprising using at least one of an image or a pressure sensor for indicating removal or replacement of the item.

14. The method of claim 1, further comprising:
    predicting the movement of the user based on at least one of using at least one of the fixed terminal or a plurality of fixed terminals, or using reflected signals received by a receiver of at least one of the fixed terminal or one of the fixed terminals from a transmitter of at least one of the fixed terminal or another of the fixed terminals; and
    using the determined movement of the user to improve the predicted movement of the user.

15. A wireless apparatus comprising:
    a receiver to receive a signal from a transmitter of a mobile terminal associated with a user, the signal following one of a direct signal path or a reflected signal path, the mobile terminal moving as the user moves; and
    a controller configured to:
    generate a signature of a movement of the user based on a change in the signal received from the transmitter, the signature including information determining the direct signal path and the reflected signal path, the information describing how the signal propagates from the transmitter to the receiver,
    predict movement patterns based on the information,
    match the signature with prior stored movement information and the predicted movement patterns, the movement information including captured movements associated with corresponding signatures, the captured movements including at least one of movements of the user,
    determine the movement of the user based on the matched signature with the prior stored movement information and the predicted movement patterns, and
    identify an item based on the determined movement of the user.

16. The apparatus of claim 15, wherein the controller is configured to generate the signature based on channel state information (CSI) from the mobile terminal.

17. The apparatus of claim 15, wherein the controller is configured to determine a location of the mobile terminal.

18. The apparatus of claim 17, wherein the controller is configured to identify the item being selected by matching the location of the mobile terminal with stored item location information.

19. A system comprising
the receiver according to claim 15;
the controller according to claim 15; and
a plurality of fixed terminals,
wherein the controller is configured to
  predict the movement of the user based on at least one of using at least one of the fixed terminal or a plurality of fixed terminals, or using reflected signals received by the receiver of at least one of the fixed terminal or one of the fixed terminals from the transmitter of at least one of the fixed terminal or another of the fixed terminals, and
  use the determined movement of the user to improve the predicted movement of the user.

20. A non-transitory storage medium comprising computer program instructions, the computer program instructions, when executed by a processor, configured to cause the processor to perform the steps of:

receiving a signal at a receiver of a fixed terminal from a transmitter of a mobile terminal associated a user, the signal following one of a direct signal path or a reflected signal path, the mobile terminal moving as the user moves;

generating, at the receiver of the fixed terminal, a signature of a movement of the user based on a change in the signal received from the transmitter, the signature including information determining the direct signal path and the reflected signal path, the information describing how the signal propagates from the transmitter to the receiver;

predicting movement patterns based on the information;

matching the signature with prior stored movement information and the predicted movement patterns, the movement information including captured movements associated with corresponding signatures, the captured movements including at least one of movements of the user;

determining the movement of the user based on the matching the signature with the prior stored movement information and the predicted movement patterns; and identifying an item based on the determined movement of the user.

* * * * *